US 7,392,926 B2

(12) United States Patent
Teraoka

(10) Patent No.: US 7,392,926 B2
(45) Date of Patent: Jul. 1, 2008

(54) ELECTRICALLY-CONTROLLED SOLDERING POT APPARATUS

(75) Inventor: Yoshitomo Teraoka, Osaka (JP)

(73) Assignee: Hakko Corporation, Osaka (JP)

( * ) Notice: Subject to any disclaimer, the term of this patent is extended or adjusted under 35 U.S.C. 154(b) by 88 days.

(21) Appl. No.: 10/942,688

(22) Filed: Sep. 15, 2004

(65) Prior Publication Data

US 2006/0054658 A1 Mar. 16, 2006

(51) Int. Cl.
*B23K 3/06* (2006.01)
(52) U.S. Cl. ..................................... 228/56.1
(58) Field of Classification Search ........ 228/56.1–56.2
See application file for complete search history.

(56) References Cited

U.S. PATENT DOCUMENTS

| | | | |
|---|---|---|---|
| 154,077 A | | 8/1874 | Perkins |
| 2,390,498 A | * | 12/1945 | Capita .......................... 427/234 |
| 2,767,300 A | | 10/1956 | De Verter |
| 2,908,796 A | * | 10/1959 | Reichelt et al. ............. 219/421 |
| 3,037,274 A | | 6/1962 | Hancock |
| 3,269,633 A | * | 8/1966 | Bernier et al. ................. 228/36 |
| 3,578,948 A | * | 5/1971 | Friend et al. ................. 219/230 |
| 3,833,163 A | * | 9/1974 | Denslow et al. ............ 228/56.2 |
| 3,834,604 A | * | 9/1974 | Fendley et al. ............. 228/15.1 |
| 4,562,337 A | | 12/1985 | Lawrence |
| 4,616,775 A | * | 10/1986 | Simonetti ..................... 228/37 |
| 4,698,774 A | * | 10/1987 | Abe et al. .................... 700/212 |
| 4,775,776 A | * | 10/1988 | Rahn et al. .................. 219/388 |
| 4,779,790 A | * | 10/1988 | Wallgren et al. ......... 228/180.1 |
| 4,891,497 A | | 1/1990 | Yoshimura |
| 5,023,848 A | | 6/1991 | Frey et al. |
| 5,402,563 A | * | 4/1995 | Satoh et al. ................... 29/829 |
| 6,087,631 A | | 7/2000 | Miyazaki |
| 6,250,537 B1 | * | 6/2001 | Avila et al. ............... 228/179.1 |
| 6,705,506 B1 | * | 3/2004 | Sund ........................... 228/42 |
| 2006/0186175 A1 | * | 8/2006 | Kay ............................. 228/36 |

FOREIGN PATENT DOCUMENTS

| | | |
|---|---|---|
| JP | 05329629 | 12/1993 |
| JP | 11337468 A * | 12/1999 |

OTHER PUBLICATIONS

IBM Technical Disclosure Bulletin NN9102320, Solder Repair Tool, Feb. 1, 1991, vol. 33, Issue 9, pp. 320-322.*
James L. Schmerbauch, What Hi-Rel Specifications Say About Solder Pots, Electronic Packaging & Production, Jul. 29, 1989, vol. 29, No. 19, pp. 60-62, Cahrers Publishing Co. Newton, Massachusets, USA.
Wenesco Internet Catalogue for Wave Solder Pots @2004.

* cited by examiner

*Primary Examiner*—Kiley Stoner
(74) *Attorney, Agent, or Firm*—Squire, Sanders & Dempsey LLP

(57) ABSTRACT

An electrically-controlled soldering pot apparatus with a timer control mechanism and a temperature control mechanism; a method of alerting a user when to exchange a solder bath of the apparatus before erosion to the solder bath occurs; and a method of varying the heating rate applied to a variety of lead-free solders in a solder bath housed in the apparatus.

26 Claims, 9 Drawing Sheets

FIG. 7
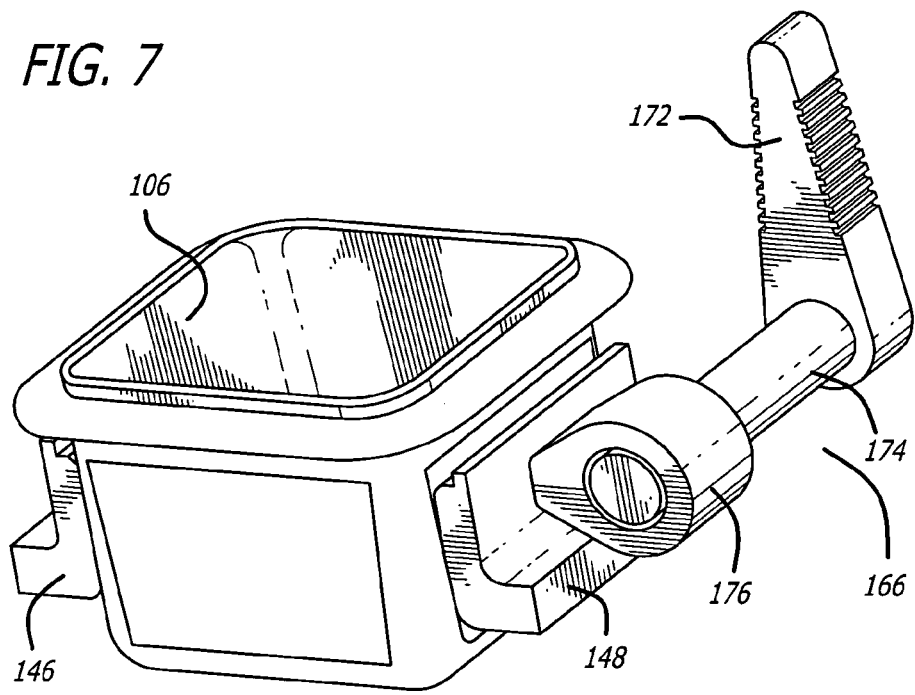
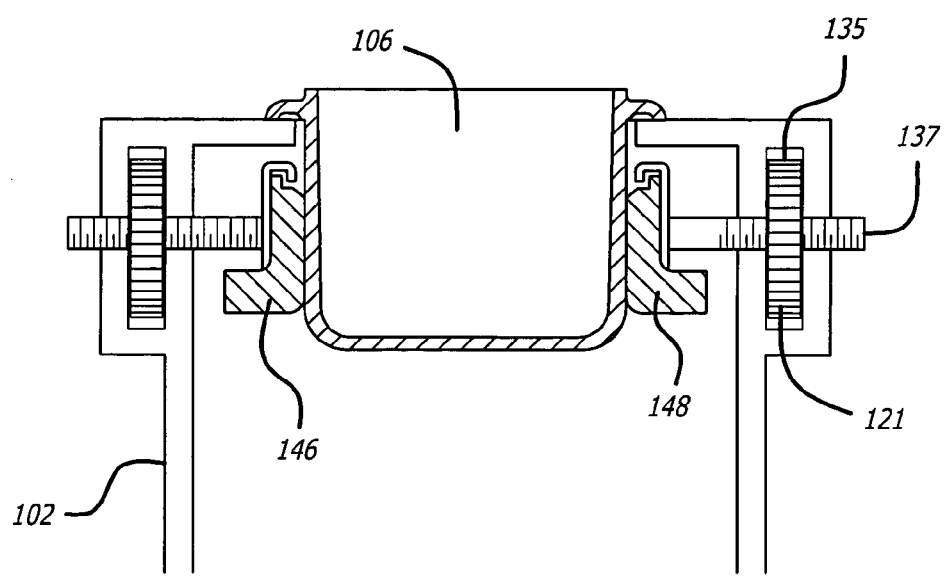
FIG. 8

ELECTRICALLY-CONTROLLED SOLDERING POT APPARATUS

BACKGROUND OF THE INVENTION

Soldering baths are generally used for holding molten solder, which, once molten, may be applied to an electrical component substrate to couple various electrical components to the same. Electrically-controlled soldering baths are known in the art. A typical electrically-controlled soldering bath may have, for example, a solder pot to hold molten solder, a heating mechanism to heat the solder, and an electrical control mechanism to control the supply of power to the heating mechanism. Typically, solder is composed of either a lead-based alloy, such as lead-tin, or more recently, a lead-free metal alloy, such as tin-copper, tin-silver, tin-silver-copper or tin-zinc. With increased environmental concerns and regulations, lead-free solder is now broadly used.

With the advent of lead-free solders, certain problems have arisen in relation to certain components of soldering baths. For example, a typical problem associated with conventional soldering baths is the erosion of the soldering bath. A typical soldering bath is made of stainless steel and tends to erode over time, especially if the soldering bath houses lead-free solder, which tends to erode the soldering bath faster than lead-based solders. The erosion of a stainless steel soldering bath may leach impurities into the lead-free molten solder, compromising the integrity of the molten solder. Moreover, the erosion of the soldering bath may create a safety hazard to the user since the structural integrity of the typical stainless steel soldering bath may be compromised by erosion. Furthermore, erosion may breach the structural integrity of the soldering bath such that molten solder leaks from the soldering bath, which in turn may burn the operating mechanism and create a fire risk. To address these problems, some manufacturers now manufacture soldering baths made of, for example, cast iron, titanium or stainless steel coated with nitrides. Although these alternative soldering baths may be resistant to erosion for a longer period of time, they are still not ultimately protected from erosion and will experience the same problems as discussed above when their lifetimes expire.

Another problem associated with conventional electrically-controlled soldering baths relates to the time in which it takes to melt the various lead-free solders typically used, e.g., tin-copper, tin-silver, tin-silver-copper or tin-zinc. For example, the melting point of tin-copper(0.7%) is 227 degrees Celsius, tin-silver(3.5%) is 216 degrees Celsius, and tin-silver(3.5%)-copper(0.7%) is 217 degrees Celsius. In a conventional soldering bath, the heat applied to the soldering bath for any given lead-free solder is uniform and uncontrolled. Thus, the various lead-free solders are subjected to the same amount of heat without any regard to the individual melting points of various lead-free solders. This may lead to overheating of a given lead-free solder or, alternatively, an unnecessary increase in time to melt the lead-free solder.

Yet another problem is the heating mechanism associated with a conventional soldering pot apparatus. Typically, the heating mechanism is integrated or affixed directly onto or into a soldering bath in conventional soldering pot apparatuses. Because of the nature of applying solder in a soldering application, molten solder typically may leak onto the soldering pot, and therefore the heating mechanism. Thus, when the need arises to exchange the soldering bath, the heating mechanism may be permanently stuck to the soldering bath. Therefore, the entire soldering bath apparatus may need to be replaced once the lifetime of the soldering pot expires. Thus, improvements to the problems discussed previously are desired.

SUMMARY OF THE INVENTION

The present invention relates to an electrically-controlled soldering pot apparatus with a timing control mechanism and a temperature control mechanism; a method of alerting a user when to exchange a solder bath before solder leaking by erosion to the solder bath occurs in an electrically-controlled soldering pot apparatus; a method of varying the heating rate applied to a variety of solders in a solder bath housed in an electrically-controlled soldering pot apparatus; and a method of changing solder baths.

The soldering pot apparatus comprises a heater assembly releasably coupled to a cup-shaped solder bath with a flange. A solder bath support places the heater assembly in thermal contact with the solder bath, which is secured to the solder bath by a securing mechanism. Both the solder bath and the heater assembly may be mounted or dismounted by manipulation of the securing mechanism. The solder bath support is adapted to rest on a lower horizontal surface of the housing and position the solder bath at a distance from the lower horizontal surface. A tray is situated beneath the solder bath and secured by the solder bath support. The tray is provided to collect solder which may leak from a cracked solder bath positioned above it. A housing encloses the components and includes a face plate with user controls to select a plurality of control functions and an on/off switch. A power supply cord is attached to the housing to supply power to the soldering pot apparatus.

To alert a user when to replace a given solder bath before it begins to leak solder by erosion, a timing control mechanism is provided. User interaction to set the timing control mechanism takes place at the user controls. The timing control mechanism is electrically coupled to a power supply, which in turn supplies power to the heater assembly, which in turn provides heat to the soldering bath. Before operation, a user may program the timing control mechanism to a preferred time value. Once the preferred time value is reached, the power provided to the heating blocks by a set of heaters will automatically be terminated and an alarm (or other audio or visual indicator) will then sound, alerting the user that the solder bath needs to be exchanged. If the soldering pot apparatus is unplugged or switched off, the pre-set preferred time value is retained by a memory circuit. The timing control mechanism is not limited to alerting the user when to exchange the soldering bath, but may also be programmed, for example, to shut down power to the heater assembly in the event a user forgets to turn off the apparatus.

To decrease the time to melt lead-free solders, a temperature control mechanism is provided. User interaction to set the temperature control mechanism takes place at the user controls. The temperature control mechanism comprises a plurality of user controls on the face of the soldering pot apparatus housing, a heating mechanism and a sensor. The user controls may be programmed to a numerical value which corresponds to a conventional lead-free solder, such as tin-copper, tin-silver, tin-silver-copper or tin-zinc, which in turn corresponds to a preferred temperature. Additionally, the user controls may be programmed to a numerical value which corresponds to a solder bath size, which in turn corresponds to a preferred temperature. Once a conventional lead-free solder type and a solder bath size are programmed into the apparatus by the user, full power from the power supply is applied to the heater assembly until the preferred temperature as measured by the temperature of a heating block is detected by the sensor. Once the preferred temperature is reached as detected by the sensor, the temperature is controlled so that the lead-free solder remains in a molten state while simultaneously preventing the lead-free solder from overheating or from becoming solid.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 7 is a perspective view of a second alternative securing means for securing the heater assembly of FIG. 3 to a solder bath.

FIG. 8 is a simplified cross-sectional view of the soldering pot apparatus of FIG. 1 illustrating a third alternative securing means for securing the heater assembly of FIG. 3 to a solder bath.

DETAILED DESCRIPTION OF PREFERRED EMBODIMENTS OF THE INVENTION

Figure 1:
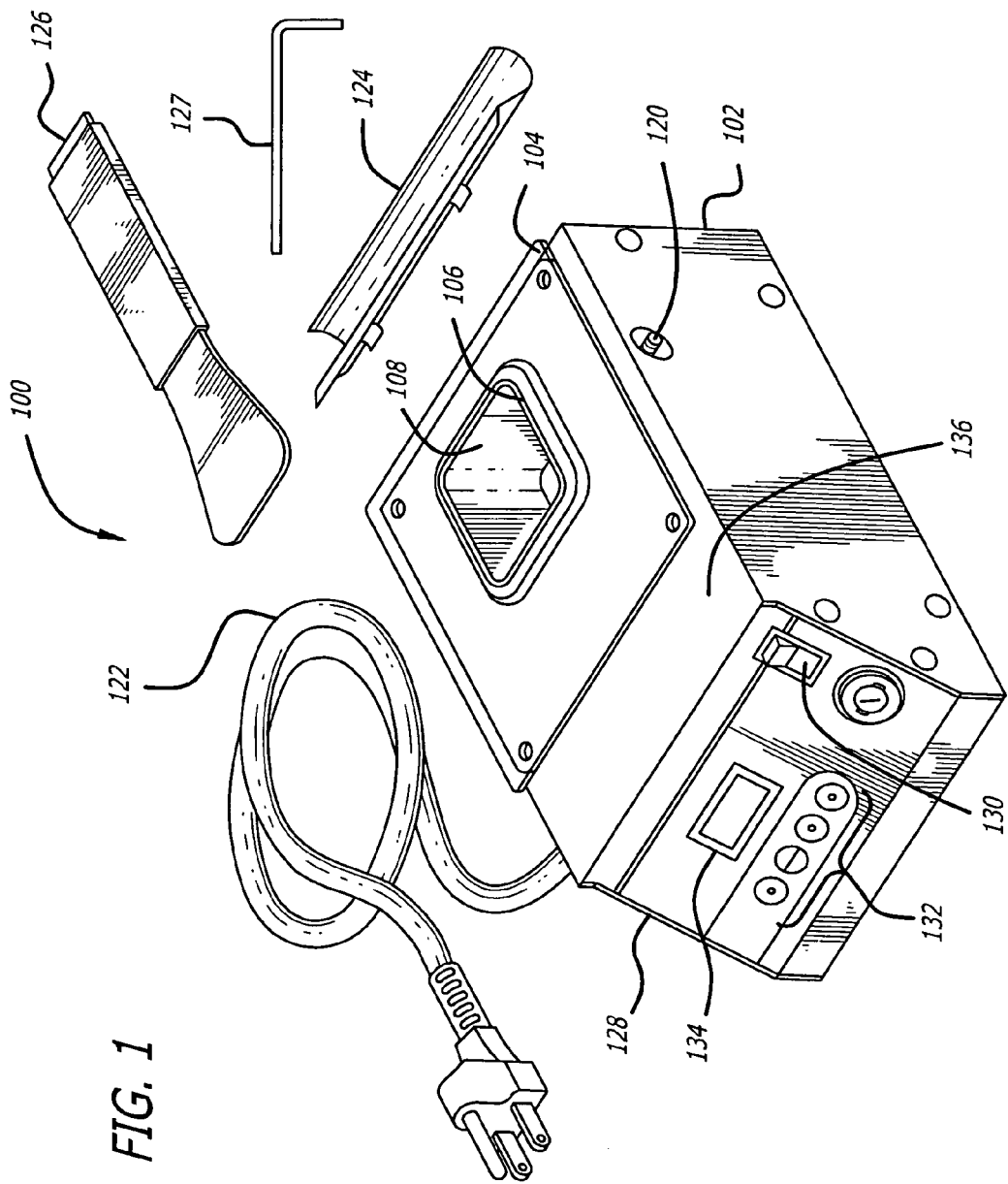
FIG. 1 is a perspective view of a soldering pot apparatus of the present invention.

FIG. 1 illustrates an embodiment of a soldering pot apparatus generally at 100 of the present invention. In this embodiment, a solder bath 106 is depicted with a flange 108 substantially encompassed by a housing 102. The housing 102 is approximately three-dimensional rectangular shaped and has dimensions of approximately 8.7 inches in length, 5.7 inches in width and 3.2 inches in depth. The housing 102 may be comprised of a plurality of metal plates secured together by screws, welding, or other securing means to form the substantially rectangular shape, as can be understood from FIG. 2. The housing 102 also includes a face plate 128 with an ON/OFF switch 130, a plurality of programmable buttons 132 and a display 134. Secured to an upper horizontal surface 136 of the housing 102 is an overflow tray 104. The flange 108 of the solder bath 106 is positioned such that any molten solder which may overflow or leak from the solder bath 106 when it is holding molten solder will spill onto the overflow tray 104, thereby protecting the other components of the soldering pot apparatus 100, including the housing itself, from damage caused by molten solder.

Also shown in FIG. 1 is a power cord 122 through which power is supplied to the soldering pot apparatus 100. Additionally, various accessories used in soldering applications are illustrated, such as a waste collector 124, a spatula 126 and a hex wrench 127 for manipulating the screws 120 that hold the heater assembly 144 (not shown in this figure) adjacent to the solder bath 106 (explained more fully below). Advantageously, the waste collector 124 may be attached to a plurality of different sides of the housing 102 depending on the user's preference. The waste collector 124 and spatula 126 may be made of stainless steel, titanium, cast iron or similar heat-resistant material.

Figure 2:
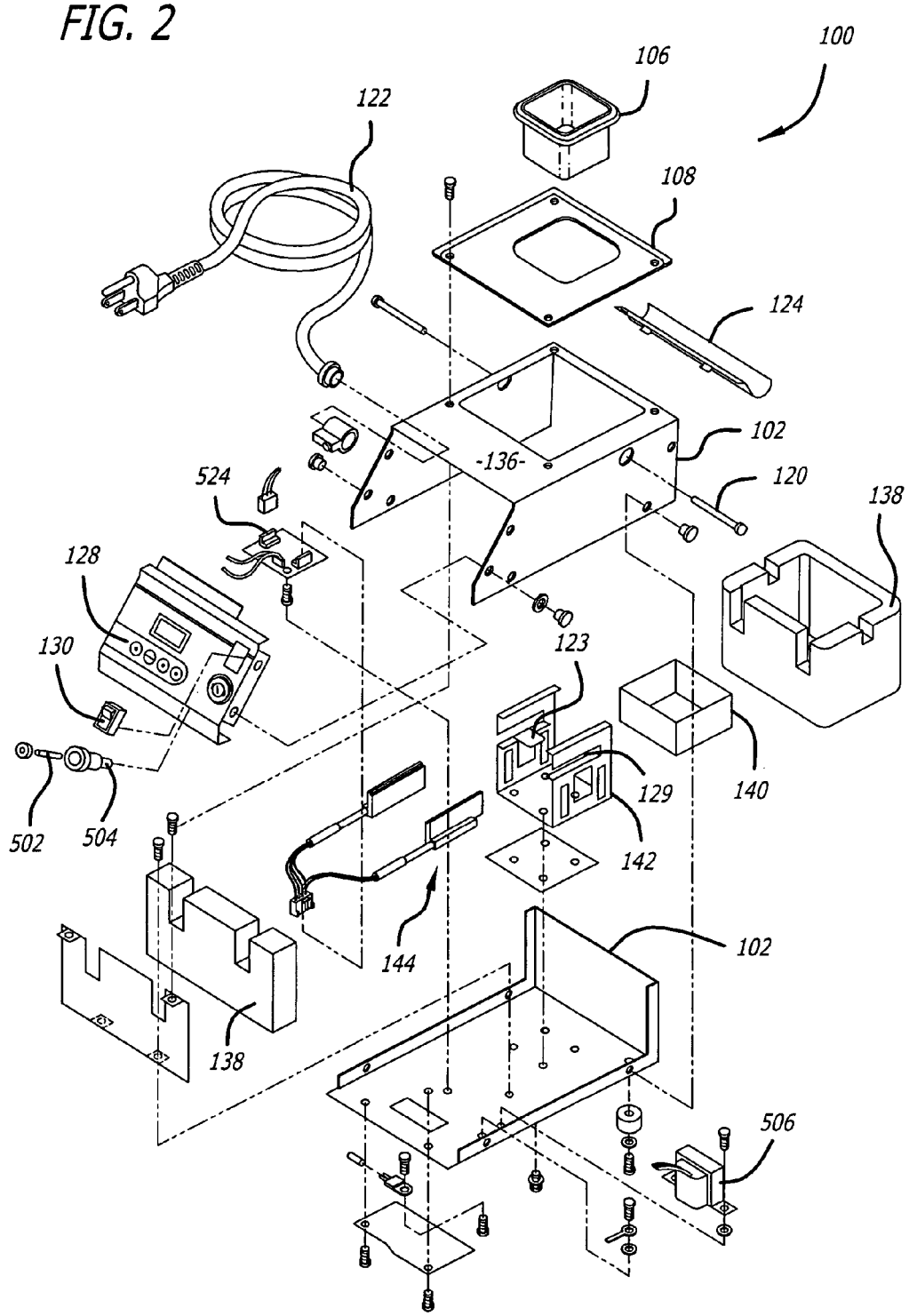
FIG. 2 is an exploded perspective view of the soldering pot apparatus of FIG. 1.

In FIG. 2, an exploded view of the soldering pot apparatus 100 is illustrated. In this view, internal components of the solder pot apparatus 100 and their relationship to each other are more clearly shown. For example, the heater assembly 144 is shown in relation to a solder bath support 142, which is shown in relation to a drip tray 140 and a heat insulator 138. As explained more fully below, the solder bath support 142 supports the solder bath 106 by horizontal protrusions 123 and 129 while simultaneously supporting the heater assembly 144 by a first and second set of flanges 133 and 135 (see FIG. 5) in a position adjacent to the solder bath 106. Moreover, a drip tray 140 which catches molten solder in the event that the bottom (or sides) of the solder bath 106 is breached is also supported by the solder bath support 142. Also shown in FIG. 2 are the metal plates of the housing 102 which comprise the housing 102, the overflow tray 104, face plate 128 of the housing 102 as well as a connector PWB 524, a fuse 502, a fuse holder 504, a transformer 506, and a power switch 130 (discussed more fully below).

Figure 3:
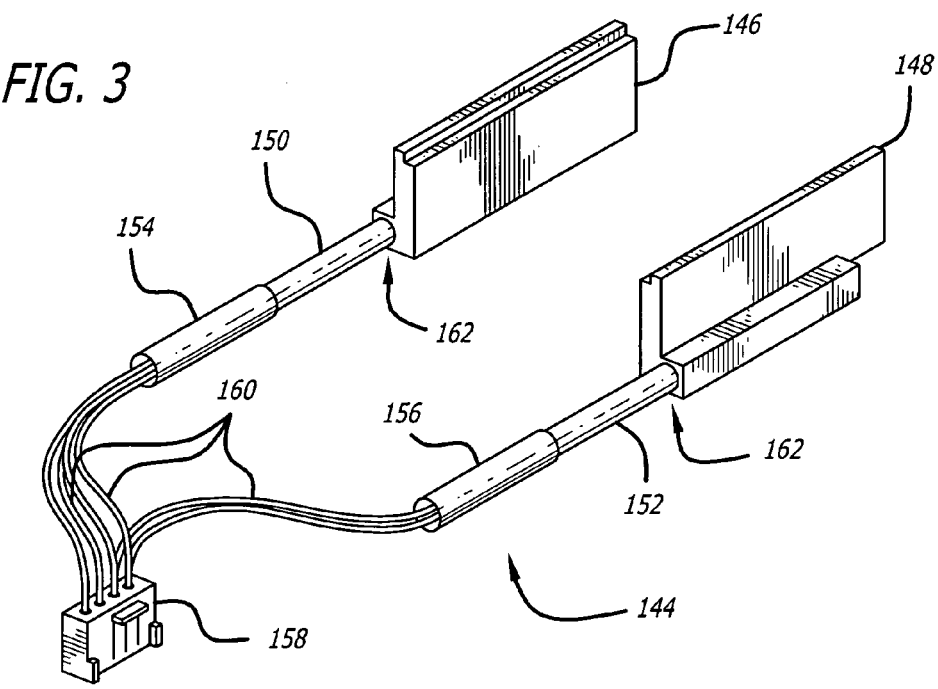
FIG. 3. is a perspective view of a heater assembly of the soldering pot apparatus of FIG. 2.

FIG. 3 illustrates in enlarged detail the heater assembly 144 of the present invention. The heater assembly 144 includes a first heating block 146 and a second heating block 148 with an opening 162 for insertion of a first heater 150 and a second heater 152, respectively. The second heater 152 includes an integrated temperature sensor 170 (shown in FIG. 10). The heating blocks 146 and 148 may be comprised of copper, a copper alloy or similar thermally conducting metal. On the other hand, the heaters 150 and 152 may be comprised of a ceramic insulating resistance pattern of tungsten or a similar material which withstands very high temperatures. Alternatively, the heaters 150 and 152 may be nickel-chrome or iron-chrome resistant wire heaters. Additionally, the heaters 150 and 152 are approximately four to eight mm in diameter, preferably six mm in diameter, and seventy to ninety mm in length, preferably eighty mm in length. Generally, power consumption of the heaters 150 and 152 is between eighty and one-hundred and twenty Watts, typically one-hundred Watts. As shown in FIG. 3, the heating blocks 146 and 148 are electrically coupled by lead wire 160 to a connector 158, with insulating tubes 154 and 156 providing insulation on the electrical terminals of heaters 150 and 152.

Figure 4:
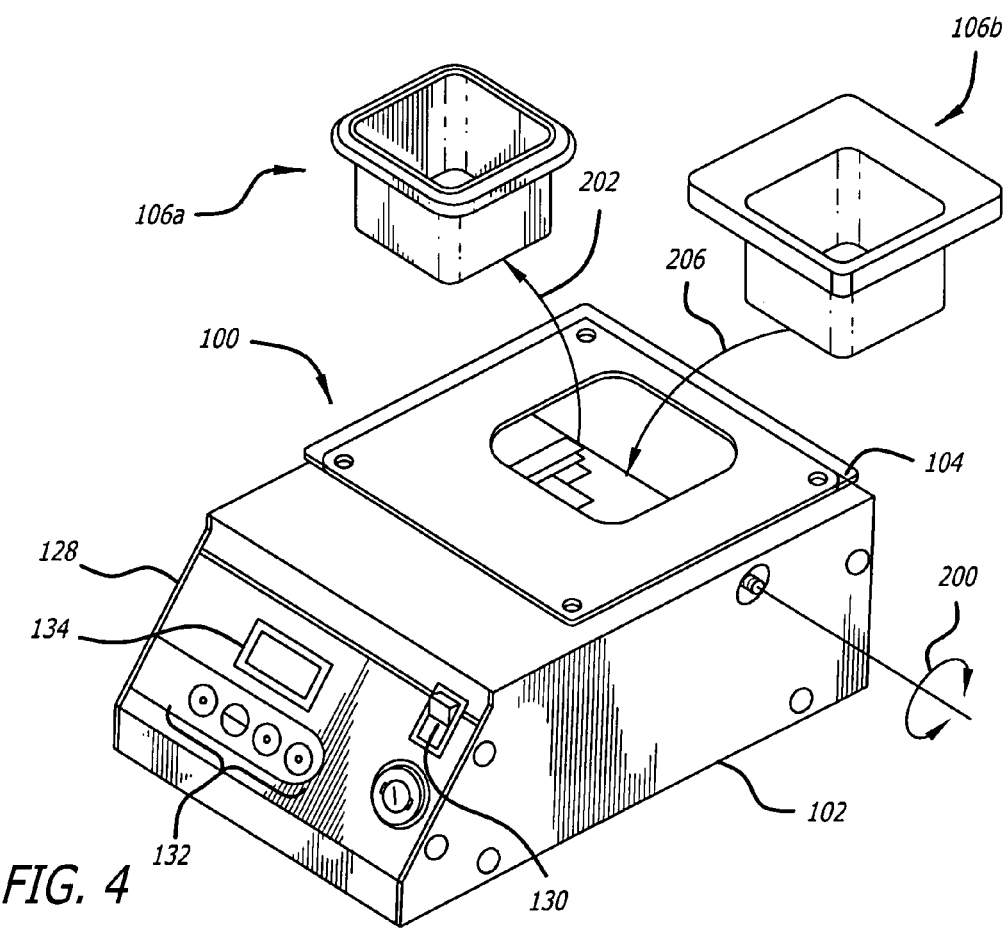
FIG. 4 illustrates the exchanging of a first solder bath for a second solder bath of the soldering pot apparatus of FIG. 1.

The soldering pot apparatus 100 is adapted to hold a plurality of sizes of the solder bath 106. For example, as shown in FIG. 4, a first solder bath 106a may be exchanged for a second solder bath 106b by rotating screws 120 (arrow 200) with the hex wrench 127. The first solder bath 106a may then be removed (arrow 202) and replaced with the second solder bath 106b (arrow 204). The first solder bath 106a may be approximately fifty mm in length, fifty mm in width, and forty-two mm in depth, with a volume between ninety and one-hundred and twenty cm$^3$, preferably one-hundred and five cm$^3$. In contrast, the second solder bath 106b may be approximately seventy-five mm in length, seventy-five mm in width, and fifty-five mm in depth, with a volume between one-hundred and forty and one-hundred and seventy cm$^3$, preferably one hundred and fifty five cm$^3$. Alternatively, the first and second solder baths 106a and 106b may be the same size. Both solder baths 106a and 106b may be made of stainless steel, titanium, cast iron or similar heat-resistant material. Moreover, the solder bath 106 may be treated with an anti-erosion treatment, such as enameling or a nitride coating. The method of exchanging solder baths is explained below.

Figure 5:
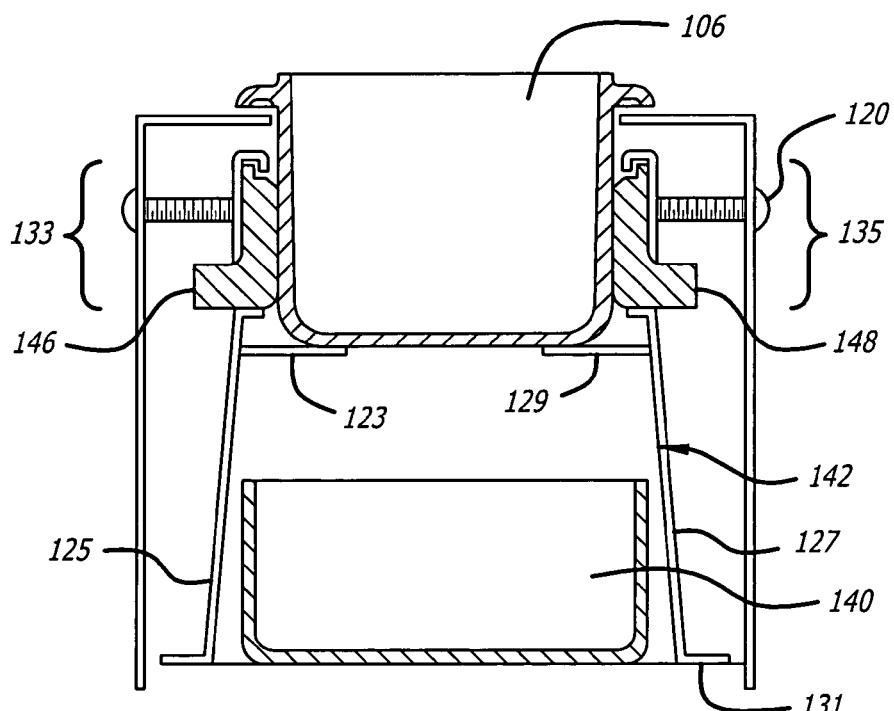
FIG. 5 is a simplified cross-sectional view of the soldering pot apparatus of FIG. 1 illustrating securing means for securing the heater assembly of FIG. 3 to a solder bath.

In FIG. 5, a simplified cross-sectional view of the soldering pot apparatus of FIG. 1 is illustrated. In this embodiment, the first heating block 146 and the second heating block 148 are shown in releasable contact with the solder bath 106. The heating blocks 146 and 148 may be situated equally opposite of one another adjacent to the solder bath 106. The heating blocks 146 and 148 are held adjacent to the solder bath 106 by the solder bath support 142 secured by screws 120, bolts 164 (see FIG. 6), a cam mechanism 166 (see FIG. 7) or a tightening wheel mechanism 121 (see FIG. 8).

The solder bath support 142 includes at least two vertical legs 125 and 127, at least two horizontal protrusions 123 and 129, at least two sets of flanges 133 and 135 and a lower horizontal member 131 adapted to be flush with a horizontal surface. As discussed previously, the horizontal protrusions 123 and 129 support the bottom of the solder bath 106 such that it is held a distance above the lower horizontal member 131. Situated on the lower horizontal member 131 between the vertical legs 125 and 127 of the solder bath support 142 may be the drip tray 140. In the event that molten solder compromises the structural integrity of the solder bath 106, the tray 140 will catch any leaking molten solder and protect the solder pot apparatus 100 from heat damage caused thereof.

Figure 6:
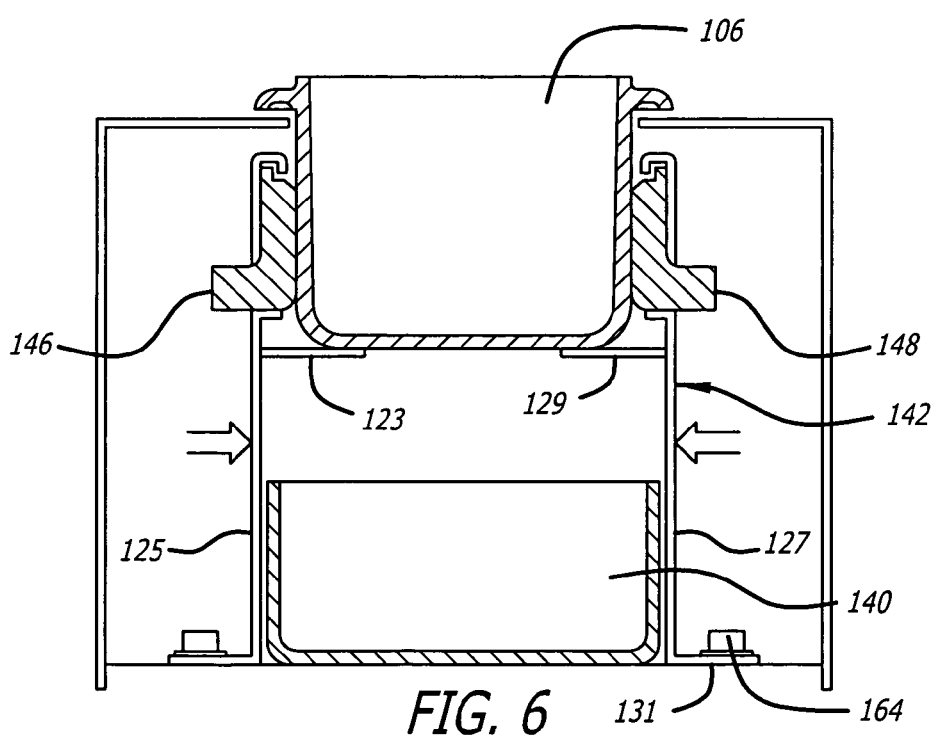
FIG. 6 is a simplified cross-sectional view of the soldering pot apparatus of FIG. 1 illustrating a first alternative securing means for securing the heater assembly of FIG. 3 to a solder bath.

FIGS. 6, 7 and 8 show alternative means to secure the heating blocks 146 and 148 to the solder pot 106. In FIG. 6, bolts 164 may be used to secure the horizontal member 131 of the solder bath support 142 to the bottom of the housing 102. The pressure on the solder bath support 142 caused by tightening the bolts 164 to the bottom of the housing 102 causes the heating blocks 146 and 148 to be flush with the solder bath 106, thereby placing the heating blocks 146 and 148 in thermal contact with the solder bath 106. In FIG. 7, cam mechanism 166, including a cam 176, a connecting rod 174 and a handle 172 may be used to put the heating blocks 146 and 148 in thermal contact with solder bath 106.

In FIG. 8, a tightening wheel mechanism 121 is used to secure the heating blocks 146 and 148 to the solder bath 106. The housing 102 may be modified such that it may accommodate the tightening wheel mechanism 121, which includes an arm 137 and a wheel 135. In this embodiment, the need for the solder bath support 142 is eliminated, as the tightening wheel mechanism 121 provides sufficient support through pressure to secure the solder bath 106 in a hanging position.

The mechanism used to secure the heating blocks 146 and 148 to the solder bath 106 as previously described has several advantages. For example, because the heating blocks 146 and 148 are secured to the solder bath 106 by pressure from the combination of the solder bath support 142 and securing means (such as screws 120, bolts 164, cam mechanism 166 or a tightening wheel mechanism 121), the heating blocks 146 and 148 may be easily mounted and dismounted from the solder bath 106, facilitating ease of exchange of the solder bath 106 when necessary (see FIG. 4). Additionally, the securing mechanism as previously discussed eliminates the need to secure a heating apparatus directly onto or into the solder bath 106, which avoids the problem of a heating apparatus sticking to the solder bath 106 due to high temperature, oxidation or molten solder drippings, making it difficult to exchange either the heating blocks or the solder bath.

Figure 9A:
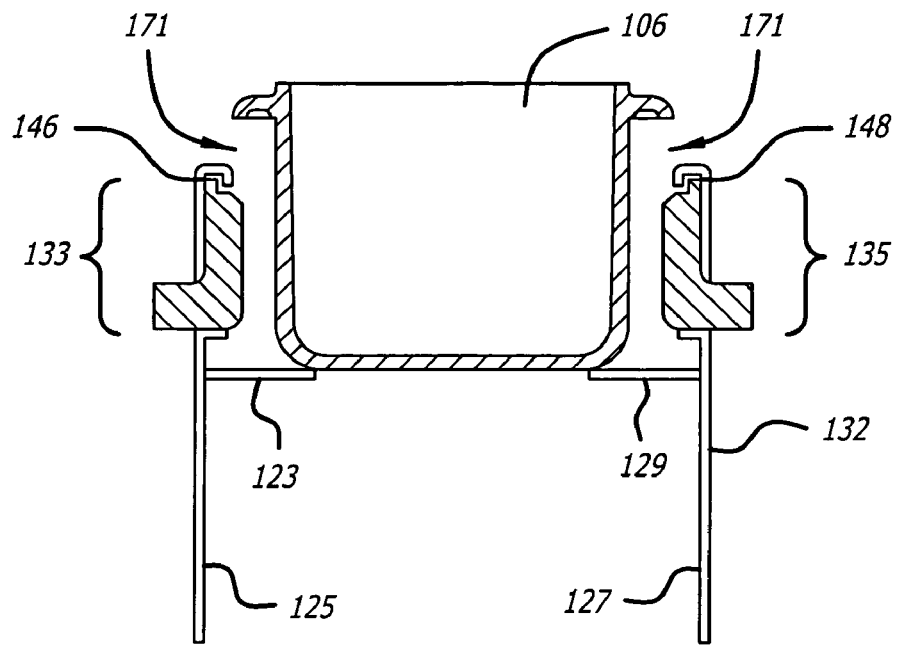
FIG. 9a is a simplified cross-sectional view of the soldering pot apparatus of FIG. 1 illustrating the heater assembly of FIG. 3 in an open position.
Figure 9B:
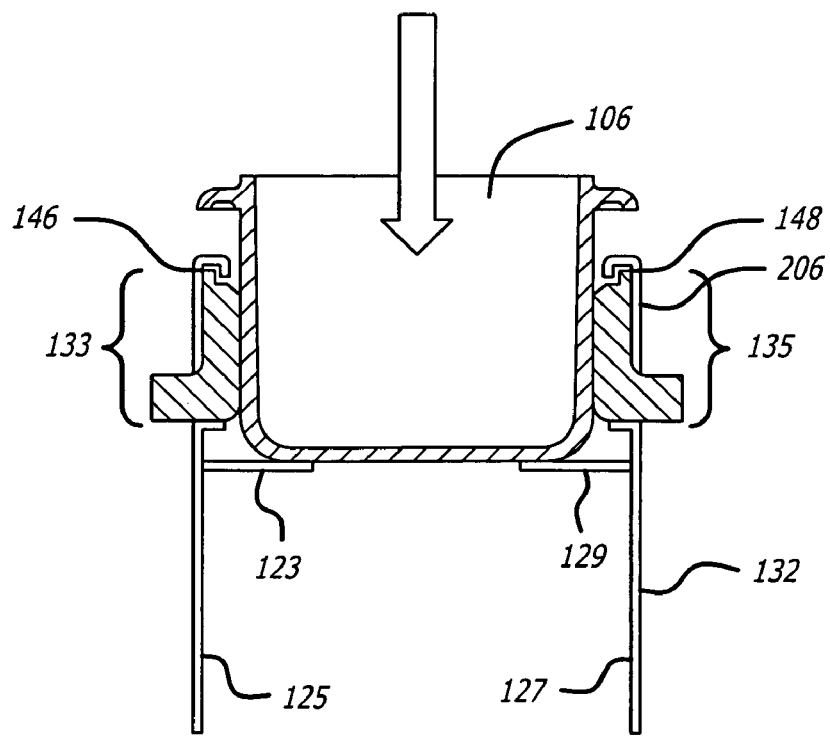
FIG. 9b is a cross-sectional view of the soldering pot apparatus of FIG. 1 illustrating the heater assembly of FIG. 3 in a closed position.

FIGS. 9a and 9b illustrate the releasable capabilities of the heating blocks 146 and 148 to the solder bath 106 in a cross-sectional view of the soldering pot apparatus 100. For example, in FIG. 9a, the heating blocks 146 and 148 are shown at a distance 171 away from the solder bath 106b after the solder bath 106a has been exchanged for a second solder bath 106b (see FIG. 4). In FIG. 9b, the heating blocks 146 and 148 are shown in thermal contact with the solder bath 106b caused by pressure (arrow 206) from tightening a securing means, such as screws 120.

Figure 10:
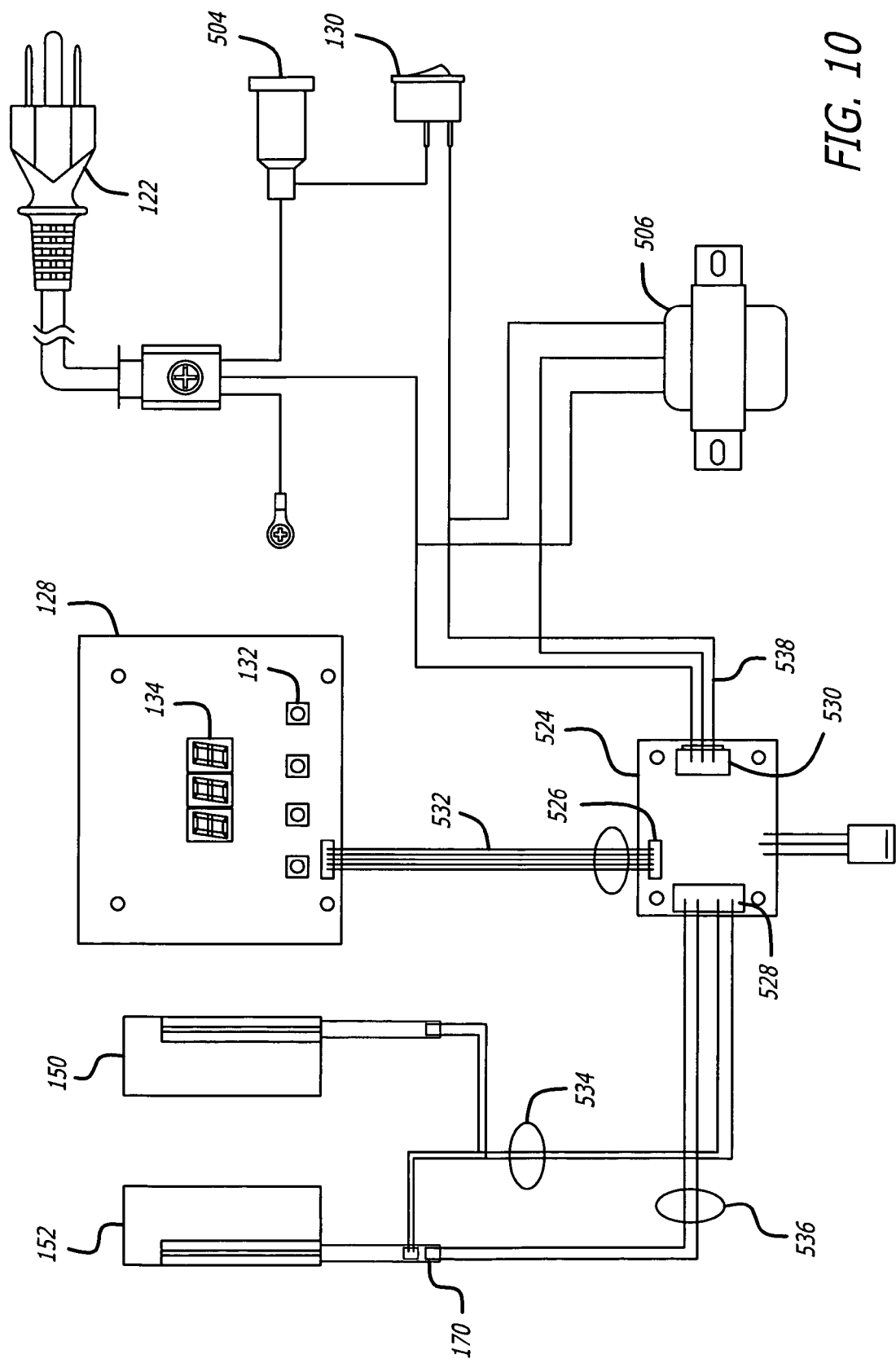
FIG. 10 is a wiring diagram of the soldering pot apparatus of FIG. 1.

FIG. 10 shows an electrical wiring diagram of the soldering pot apparatus 100. The user interface is situated on a face plate 128 and is represented by the plurality of programmable buttons 132. Alternatively, a dial, pre-programmed buttons, switches or the like may be used as the user interface. Through the programmable buttons 132, a user may program a time value, a solder type and/or a solder bath size (explained more fully below). The programmable buttons 132 are electrically coupled to a connector PWB 524 by connector leads 532. Heater leads 534 originating from the connector PWB 524 at a port 528 electrically couple to the heaters 150 and 152 of the heater assembly 144 supplying power thereto. Also, sensor leads 536 originating from the connector PWB 524 at the port 528 electrically couple to the sensor 170 of the heater 152 sensing resistance therefrom. At another port 530, electrically wiring 538 electrically couple to a transformer 506, an ON/OFF switch 130, a fuse holder 504, and, finally, the power cord 122.

Figure 11:
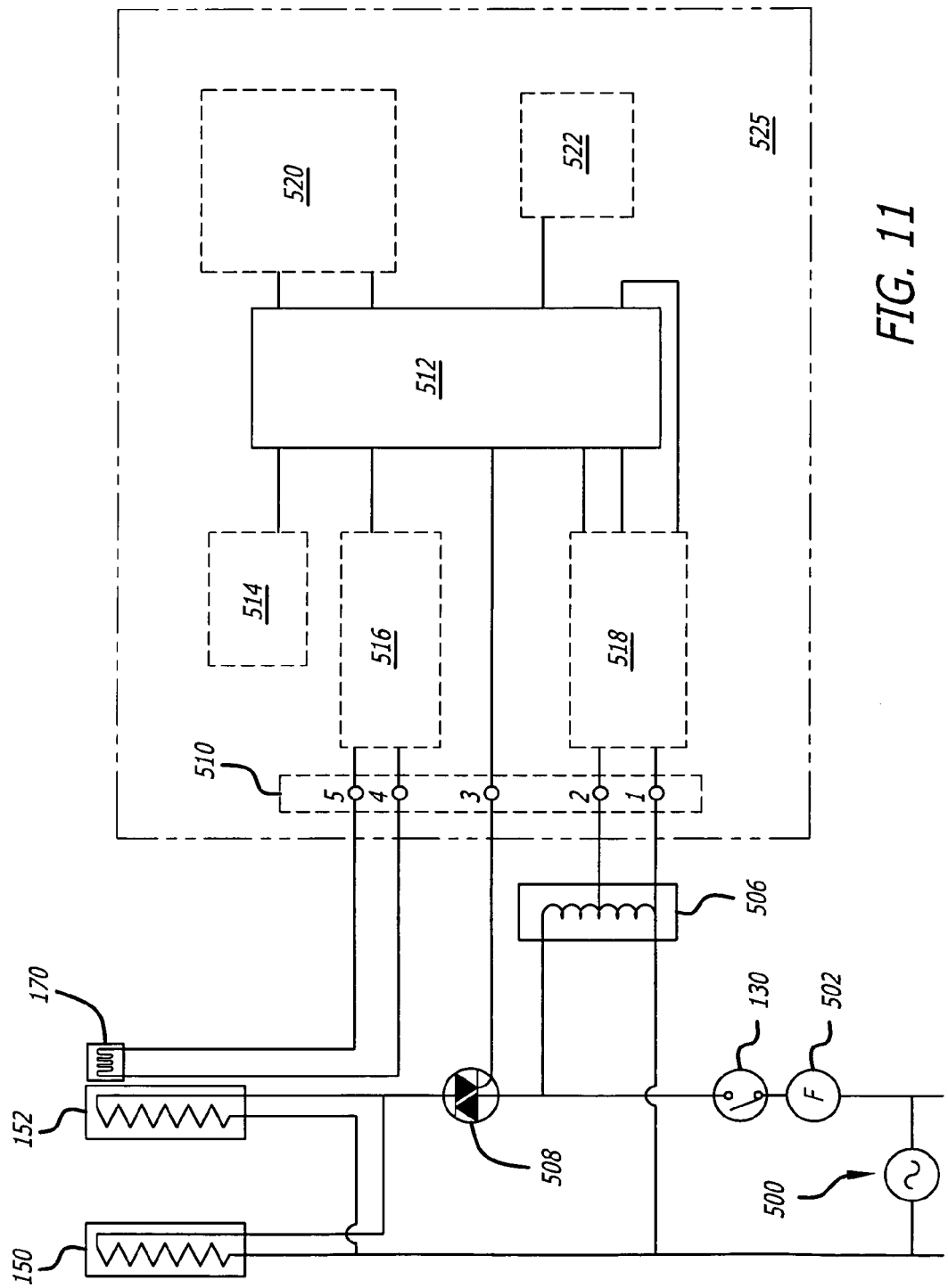
FIG. 11 is a block diagram of the schematics of the soldering pot apparatus of FIG. 1.

FIG. 11 is a block-type diagram of the schematics of the soldering pot apparatus, and is to be read in conjunction with FIG. 10. In this diagram, the control PWB 525 (behind the face plate 128 as shown in FIG. 2) is illustrated with circuitry, a microprocessor CPU 512 and a connector 510. As shown, power is supplied to the heaters 150 and 152 via an AC power input 500. The power is regulated by a plurality of electrical components, including a fuse 502, a power switch 130 and a transformer 506. The transformer 506 transforms commercial power from the AC power input 500 to approximately five volts of AC power. Once power passes through the transformer 506 via the connector 510, the power passes through a low voltage power supply circuit 518. The power supply circuit 518 prepares approximately five volts of DC power to be supplied to a microprocessor CPU 512. The CPU 512 calculates and determines certain processes according to both pre-installed software and user programmed parameters, which include a temperature control function, a calibration function and start-up control according to the programmed solder type and programmed time value. The CPU 512 then supplies power to the heaters 150 and 152 via a TRIAC 508. The TRIAC 508 is an ON/OFF control of AC current to the heaters 150 and 152 in accordance with signals from the CPU 512. The CPU 512 controls a power supply in a two step process. First the CPU 512 compares an amplified sensor signal with the pre-determined value based on each solder type during the first start-up step. Next, the CPU 512 compares the signal with the pre-set value based on the targeted temperature. Furthermore, the CPU 512 may use the PID control.

The sensor 170 may be comprised of ceramic insulating platinum or tungsten or other heat-resistant material and is incorporated within, for example, the heater 152. Moreover, the sensor 170 has the characteristic that its resistance value changes depending on temperature, whereby the temperature is measured from the voltage caused by the sensor's resistance. The voltage caused by the resistance of the sensor 170 is amplified by a sensor signal amplifier circuit 516, which passes to the CPU 512. Also shown electrically coupled to the CPU 512 is a memory circuit 514, which stores certain pre-set parameters and an accumulated used time (of the solder bath 106); an alarm buzzer circuit, which causes the CPU 512 to emit a sound once the accumulated used time is reached; and, an LED display/user-programmable inputting circuit, which processes the user-programmed input via the plurality of programmable buttons 132 displays digital information on the display 134. Certain of the functions discussed are similar to those discussed in U.S. Pat. No. 4,891,497 by Yoshimura, whose entire contents are hereby incorporated by reference.

A feature of the present invention is a timing control mechanism which may be used to alert the user when to exchange the solder bath 106 before it is breached by erosion. A user may program the timing control mechanism by programming the programmable buttons 132 on the face plate 128 to a preferred time value. Once the preferred time value is reached, the user is alerted by an alarm sound (and/or a visual signal), such as a buzzer, and the power supply to the heaters 150 and 152 ceases. The preferred time value chosen by the user will be retained even if the soldering pot apparatus 100 is switched OFF or the power supply cord 122 is pulled out from its socket. Advantageously, the timing control mechanism 300 alerts the user to exchange the solder bath 106 with a replacement soldering bath before it begins to leak by erosion and compromises the structural integrity and other components of the soldering pot apparatus 100 by leaking molten solder. It should be appreciated that the timing control mechanism is not limited to the application discussed previously, but may be used for other applications, such as for programming a time value such that the solder pot apparatus 100 will automatically shut down at the end of a user's work day.

The embodiment of the present invention as previously described may also include a temperature control mechanism. The user interface for the temperature control mechanism generally includes a plurality of buttons 132 on the face plate 128 of the housing 102. The plurality of buttons 132 may be programmed with a numerical value which corresponds to a specific solder type or to a solder bath size. For example, "21" may correspond to tin-lead, "22" may correspond to tin-silver-copper, "23" may correspond to tin-copper and "24" may correspond to tin. Similarly, "31" may correspond to a small solder bath 106a, while "32" may correspond to a large solder bath 106b. The numerical values programmed by the user ultimately correspond to a target temperature sufficient to sustain the molten state of conventional solders such as tin-lead, tin-silver-copper, tin-copper or tin. When a user programs the plurality of buttons 132, full power is supplied to the heater assembly 144 of the soldering pot apparatus 100 to liquefy the corresponding solder in the solder bath 106 until the target temperature is reached. When compared to conventional heating methods in electrical soldering baths, the time to reach the pre-set target temperature of a given lead-based or lead-free solder is therefore decreased significantly, as illustrated by comparing the graphs in FIGS. 12 and 13.

Figure 12:
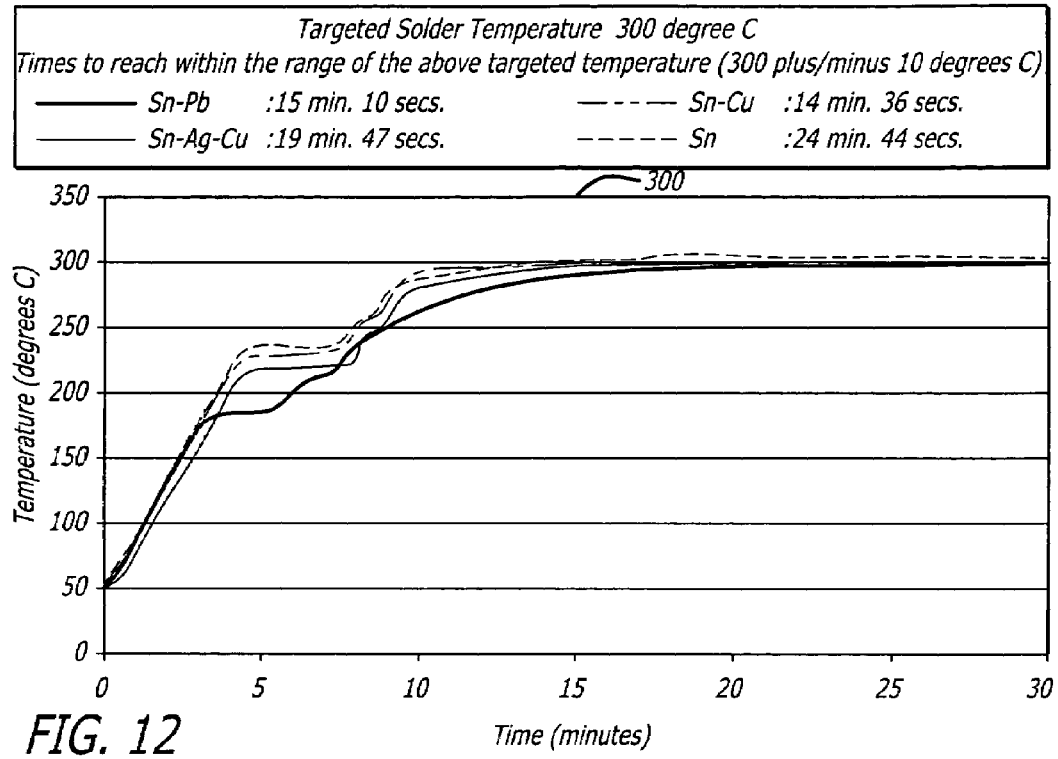
FIG. 12 is a graph showing temperature-time curves and illustrating the time necessary to reach a target temperature for lead-free solders without pre-selecting a value corresponding to a type of solder.

In the graph 300 of FIG. 12, the time to reach the target temperature in minutes for each of lead-free solders tin-silver-copper, tin-copper, and tin, in addition to lead-based solder tin-lead, is shown using conventional temperature control methods. The target temperature was reached at nineteen minutes and forty-seven seconds, fourteen minutes and thirty-six seconds, twenty-four minutes and forty-four seconds, for tin-silver-copper solder, tin-copper solder, and tin solder, respectively.

Figure 13:
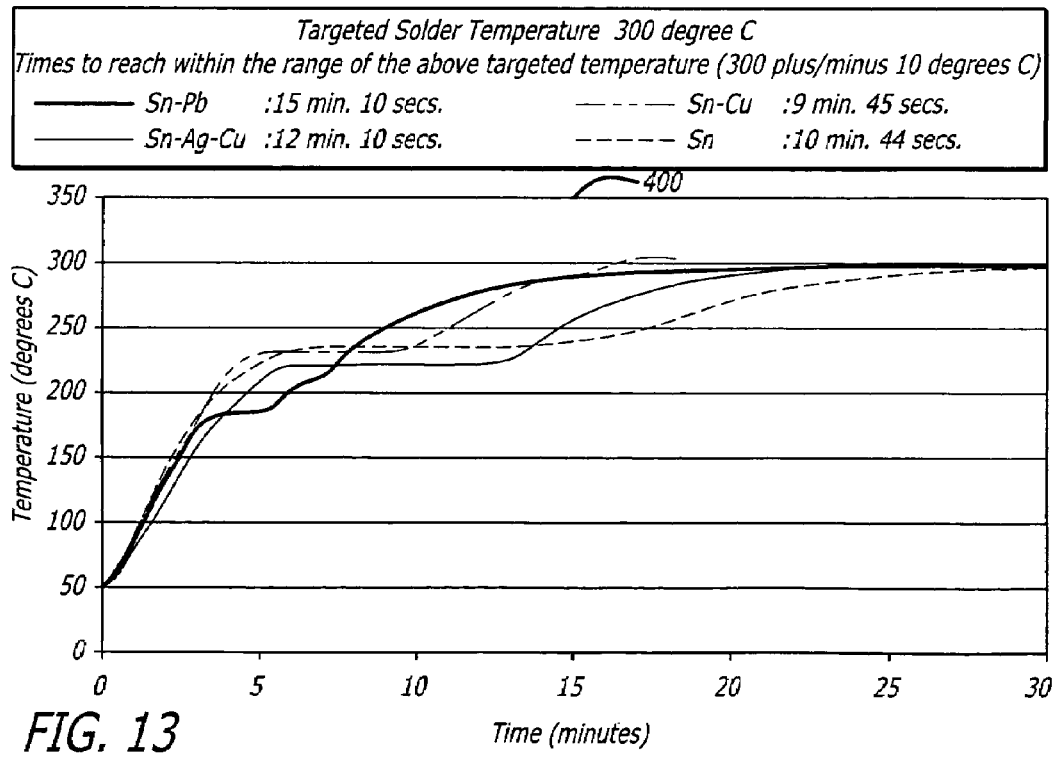
FIG. 13 is a graph showing temperature-time curves and illustrating the time necessary to reach a target temperature for lead-free solders with pre-selecting a value corresponding to a type of solder.

In contrast, in the graph 400 of FIG. 13, the time to reach the target temperature in minutes for each of lead-free solders tin-silver-copper, tin-copper, and tin, in addition to lead-based solder tin-lead, is shown using the temperature controlling mechanism of an embodiment of the present invention. The target temperature was reached at twelve minutes and ten seconds, nine minutes and forty-five seconds, and ten minutes and forty-four seconds, for tin-silver copper solder, tin-copper solder, and tin solder, respectively.

Thus, as illustrated, the temperature control mechanism significantly decreases the time needed to liquefy a given lead-free solder. This, in turn, decreases the downtime experienced by a user when waiting for a given solder to become molten, and also the power required. Moreover, once the target temperature is reached, the sensor prevents the heating mechanism from further increasing or decreasing in temperature so that the solder does not overheat or become solid.

From the foregoing detailed description, it will be evident that there are a number of changes, adaptations and modifications of the present invention which come within the province of those skilled in the art. The scope of the invention includes any combination of the elements from the different species or embodiments disclosed herein, as well as subassemblies, assemblies, and methods thereof. However, it is intended that all such variations not departing from the spirit of the invention be considered as within the scope thereof.

What is claimed is:

1. A soldering pot apparatus, comprising:
   a replaceable solder bath for molten solder; and
   at least one electric heating unit movable relative to the solder bath between a fixing and heating position and a removal position with screws, cams or wheel actuated screws, wherein in said fixing and heating position, said electric heating unit presses against said solder bath for fixably securing said solder bath and is in direct thermal contact with the solder bath for heating solder in the solder bath and in said removal position, the solder bath is away from said electric heating unit for allowing the solder bath to be removed.

2. The apparatus of claim 1, wherein the electric heating unit defines a first heating unit, and further comprising a second heating unit movable between a fixing and heating position in thermal contact with the solder bath for heating solder in the solder bath and a removal position relative to the solder bath for allowing the solder bath to be removed.

3. The apparatus of claim 2, wherein the first and second electric heating units are positioned on opposite sides of the solder bath when in the solder heating positions, and the movement of the first and second electric heating units from their respective fixing and heating positions to their respective removal positions are horizontal outward movements.

4. The apparatus of claim 1, further comprising:
   a power control system adapted to control delivery of power to the heater assembly and thereby heat to the solder bath, the power control system including a user interface for indicating which of a plurality of pre-selected solder types is to be melted in the solder bath, the power control system applying full power to the heater assembly until a pre-selected temperature over each melting point of the solder type selected by a user via the user interface is attained.

5. The apparatus of claim 4, further comprising a housing for supporting or hanging the solder bath.

6. The apparatus of claim 4, wherein the user interface includes button means for inputting the pre-selected solder type to be melted, the button means being supported by the housing.

7. The apparatus of claim 4, wherein the user interface includes a dial supported by the housing, the dial having different positions for inputting the pre-selected solder type to be melted.

8. The apparatus of claim 4, wherein the user interface includes switch means supported by the housing for inputting the pre-selected solder type to be melted.

9. The apparatus of claim 1, further comprising:
signal means for signaling when the total anticipated time the solder bath has been used reaches a predetermined time corresponding to an anticipated workable life of a solder bath of the same type, whereby the solder bath can be replaced.

10. The apparatus of claim 9, further comprising a tray in the housing, positioned below the solder bath and adapted to receive and hold solder leaking from the solder bath.

11. The apparatus of claim 1, further comprising:
a heater circuit for heating the solder bath, the heater circuit including heating means for heating the solder bath, user input means for inputting which of a plurality of pre-selected solder types is to be heated in the solder bath, and control means for applying full power of the heating means to the solder bath for a period of time corresponding to the solder type input by a user via the input means.

12. The apparatus of claim 11, further comprising a tray positioned below the solder bath and adapted to receive and hold solder leaking from the solder bath.

13. The apparatus of claim 1, further comprising:
user programmable means for controlling the operation of the heater assembly.

14. The apparatus of claim 13 wherein the user programmable means includes at least one of (a) first selector means allowing the user to indicate the size of the solder bath from a plurality of predetermined sizes and (b) second selector means for allowing the user to indicate the type of solder from a plurality of predetermined solder types.

15. The apparatus of claim 14, wherein the user programmable means controls the operation of the heater assembly based on at least one of the indicated solder bath size and the indicated solder type.

16. The apparatus of claim 14, wherein the user programmable means has the heater assembly operate at full power for a period of time determined by the user programmable means based on at least one of the indicated solder bath size and solder type.

17. The apparatus of claim 13, wherein the user programmable means includes timing means for setting a signal timer.

18. The apparatus of claim 13, further comprising a tray positioned below the solder bath and adapted to receive and hold solder leaking from the solder bath.

19. The apparatus of claim 1, further comprising:
a circuit for storing an accumulated used time of the solder bath and pre-set parameters relating to temperature, timing, solder type, and solder bath type, the circuit electrically coupled to the heater assembly.

20. The apparatus of claim 19, wherein the heater assembly includes:
a first heating block;
a second heating block;
a first ceramic heater including a temperature sensor and an insulating tube, the first ceramic heater coupled to the first heating block;
a second ceramic heater including an insulating tube, the second ceramic heater coupled to the second heating block; and
a connector, wherein the first and second ceramic heaters are electrically coupled to the connector by lead wires.

21. The apparatus of claim 19, wherein the circuit includes timing control means for signaling the lapsing of a working time value corresponding to an estimated lifetime of the solder bath.

22. The apparatus of claim 19, wherein the circuit includes temperature control means for controlling heating rates applied to the solder bath by the heater assembly.

23. The apparatus of claim 1, further comprising:
a support structure for supporting or hanging the solder bath in the fixing and heating position, wherein said position is over a tray.

24. A soldering pot apparatus, comprising:
a replaceable solder bath as a container for molten solder; and
multiple electric heaters in combination with said replaceable solder bath, said heaters releasably coupled in different areas on said replaceable bath with means by cam, screw or wheel actuated screws for moving a heater comprising multiple blocks.

25. A soldering pot apparatus, comprising:
a replaceable solder bath for molten solder;
a support structure for supporting or hanging the solder bath in a solder heating position; and
a heating unit movable relative to the solder bath between a heating position in thermal transfer contact against the solder bath for heating solder in the solder bath and a removal position relative to the solder bath for allowing the solder bath to be removed from the solder heating position, wherein the heating unit defines a first heating unit and further comprising a second heating unit movable between a heating position in thermal transfer contact against the solder bath for heating solder in the solder bath and a removal position relative to the solder bath for allowing the solder bath to be removed from the heating position.

26. The apparatus of claim 25, wherein the first and second heating units are positioned on opposite sides of the solder bath when in the solder heating positions, and the movement of the first and second heating units from their respective heating units to their respective removal positions are horizontal outward movements.

* * * * *